3,114,907
TWO-COLOR, TWO PERSISTENCE RADAR DISPLAY SYSTEMS
Alvin S. Luftman, Natick, Harold M. Asquith, Newton, and John A. Buckbee, Wellesley, Mass., assignors to Raytheon Company, a corporation of Delaware
Filed July 1, 1958, Ser. No. 746,023
6 Claims. (Cl. 343—7.7)

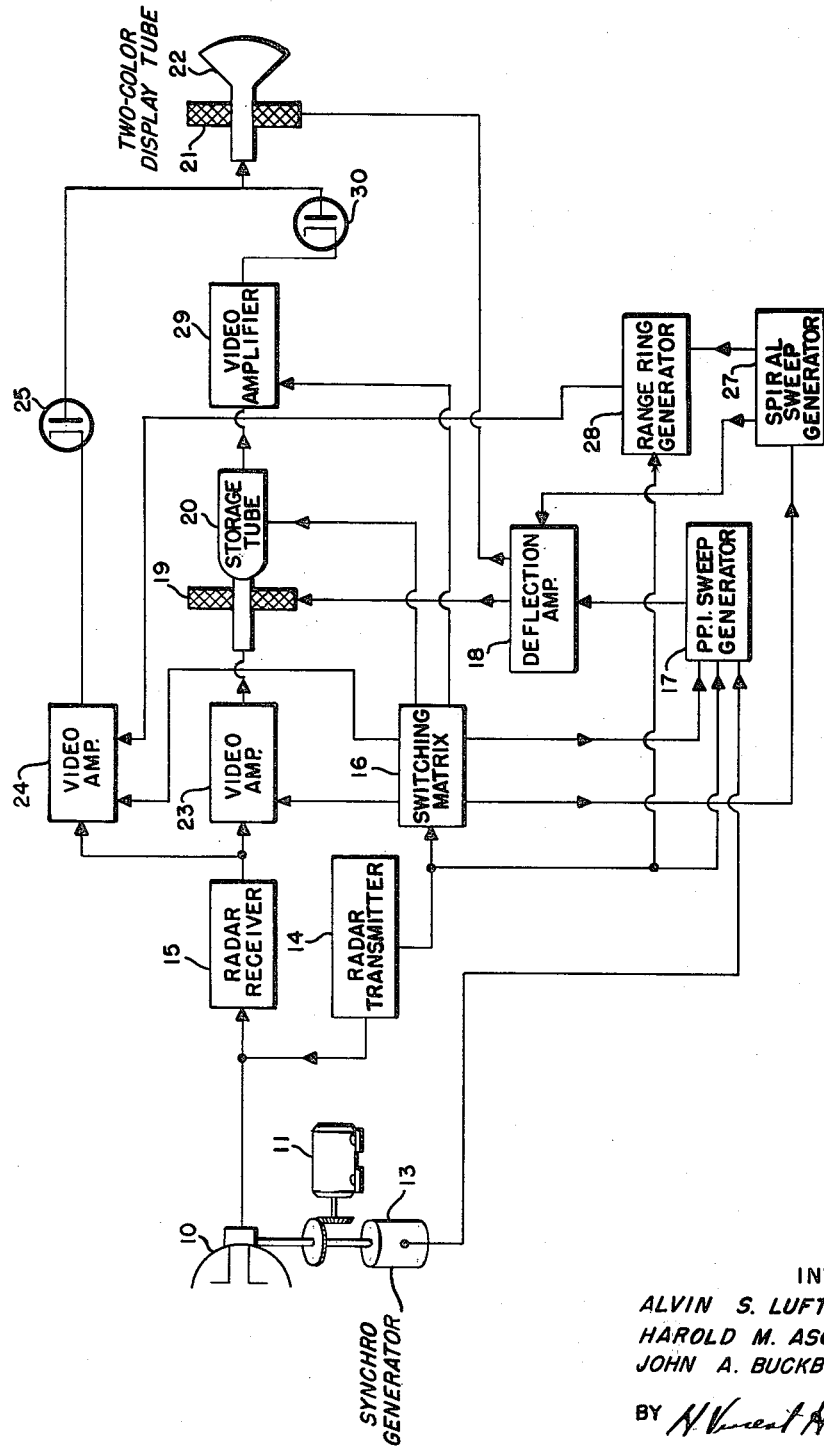

This invention relates to a system for displaying radar information and more particularly relates to a radar information display system utilizing a storage device for recording the history of targets within the area under surveillance and adapted to display the recorded information in two separate colors.

This invention is applicable to many problems involving the measurement of course and speed of moving objects and is of particular utility as a surveillance system for viewing and interpreting visual display indications attributable to either moving or stationary radar targets. The invention is an improvement upon a copending application Serial No. 658,114, by Thomas J. Kelly, entitled Radar Navigational Display, filed May 9, 1957, and assigned to the assignee of this application.

A useful radar display presentation for navigational purposes is the plan position indicator, commonly termed PPI, which provides a representation of the surrounding locality in polar coordinates, that is, azimuth angle and range. A basic disadvantage of a plan position indicator of this type results from the fact that the persistence of the phosphor used in the standard display tubes is insufficient to keep radar targets at a desirable brightness for a length of time equal to a complete antenna rotation, that is, until the antenna is again pointed in their direction. Thus, the area of the screen immediately behind the location of the PPI sweep is always quite bright, whereas the areas further behind are considerably dimmer. In addition, the standard PPI presentation referred to above does not directly indicate whether an object is stationary or in motion. In order to overcome these disadvantages, a storage tube is operated in connection with the normal PPI indicator, as described in the above-referred-to application in a manner which provides target trails which permit immediate analysis of the course the moving targets have been following. This arrangement also insures that the brightness is uniform around the complete tube regardless of antenna direction. In this so-called "history indicator," the stored radar picture is shown on the PPI display tube. Radar data is stored during each sweep interval and, after a number of antenna rotations, the stored moving targets form "tracks" or target trails on the storage tube. During the time when the stored picture is being displayed, these tracks are transferred or "read out" onto the display tube.

However, even with the help of this improved radar presentation, it is frequently difficult for the radar operator or observer to determine at which end of a radar track the target is situated. It is also difficult for the operator to distinguish trails of moving targets from land masses with configurations which are similar in size and appearance to a target trail. An observer would be better able to judge which action to take if he could immediately distinguish land masses from these target trails on the radar display and if he could quickly ascertain at which end of the trail the target is situated without the necessity of waiting until the antenna becomes pointed in the direction of the target.

The invention here disclosed takes advantage of the principle that an operator can distinguish between two colors faster than he can tell at a glance the difference between a bright and less bright target or object, particularly, when frequently he must wait the time required for an antenna rotation to provide that additional target brightness.

The invention discloses a radar transmitter and receiver for detection of fixed and moving objects and a cathode ray tube, having a short persistence color and a long persistence color, is used in the display unit. Interposed between the radar receiver and the display is a storage or memory device, the purpose of that device being the recording of the tracks of moving objects. A chart of the surveyed area is stored in the storage device from information obtained from the radar receiver. The information stored in the storage device is then fed to the display tube on a time shared basis with raw PPI data from the radar receiver. With this arrangement, the raw PPI data appears on the display tube in one color and the stored information in another color. For example, a standard two-persistence cathode ray tube may have a two-color phosphor coating such that the short persistence color is, for example, blue-white and the afterglow color is yellow. Since the raw PPI data from the receiver energizes any one portion of the screen only once each antenna rotation, it is seen mainly as an afterglow, that is, in yellow. On the other hand, since the stored picture is formed on the display tube using a high picture repetition rate, the stored trails appear blue-white. Thus, a specific moving target is seen as a yellow dot with a blue-white trail behind the dot indicating the history of the motion of that target.

The invention and its manner of operation may be appreciated with reference to the description following when considered in connection with the attached drawing in which there is illustrated in schematic form a radar system embodying the principles of the invention. An antenna 10, adapted to be rotated by a motor 11, is mounted at a radar installation, such as an airport surveillance station or a radar-equipped ship and a signal, indicative of the instantaneous bearing of the antenna is generated by synchro-generator 13. A pulsed radar transmitter 14 and a radar receiver 15 are connected to antenna 10 in the conventional manner. The pulse transmitter 14 includes a circuit which provides a trigger pulse simultaneously with the radar search pulse. The trigger pulse from transmitter 14 is impressed upon switching matrix 16 which operated similar to the switching circuit shown in FIG. 17–24 of Chapter 17, Section 3 of the Television Engineering Handbook, by Fink, 1957, published by McGraw-Hill Book Company, Inc., New York, and also is applied to PPI sweep generator 17. The output of sweep generator 17 is fed into the deflection amplifier 18 and the amplified output is applied to the deflection coils 19 of storage tube 20 and concurrently to the deflection coils 21 of a two-color display tube 22. Storage tube 20 is a type of cathode ray tube having a storage surface which is scanned by an electron beam. The beam may be swept by means of electrostatic deflection plates, but since magnetic deflection coils are the more usual manner of controlling movement of the beam, magnetic deflection coils are indicated in the schematic drawing. One function of the electron beam is to lay upon the storage surface an electrostatic charge pattern which represents the information impressed upon the input circuit of the storage tube. That electrostatic charge pattern remains on the storage surface until erased. The information stored in the storage tube can be read out without destroying the stored information by causing the electron beam to scan the storage surface. It should be understood that the potential of the electron beam when writing information on the storage surface is different from the potential of the beam when reading out information. Thus, certain electrode potentials of the storage tube must be changed when switching the tube from a "write" to a "read" function. The information on the storage surface is erased by causing the electron beam to scan that surface with a potential which is different from either the "write" or "read" potentials. The operation of the storage tube 20 is described in detail in an article by R. D. Hergenrother and A. S. Luftman entitled "Performance Characteristics of the Recording Tube," in the Proceedings of the National Electronic Conference, vol. 8, pages 543–552, January 1953.

Radar video information from radar receiver 15 is passed into video amplifiers 23 and 24 which have been gated by switching matrix 16 to amplify input signals. The amplified video information from video amplifier 23 is written into storage tube 20, while the signals from video amplifier 24 are written into display tube 22 by way of isolation diode 25. These signals are applied to the display tube for a time-per-radar search pulse appropriate to the range in use. The storage tube prior to the "write" period, is conditioned to write by bias potentials originating in switching matrix 16. During this "write" period, the storage surface of tube 20 and display surface of tube 22 are scanned by a PPI radial sweep generated by PPI sweep generator 17 which has been set into operation by the trigger pulse from radar transmitter 14 by way of switching matrix 16. In order to cause the PPI radial trace to rotate in synchronism with the rotation of antenna 10, antenna rotation information of synchro-generator 13 is fed to PPI sweep generator 17. During the aforementioned "write" period, the display surface of display tube 22 is scanned to produce the color yellow. After an appropriate interval, the PPI sweep in the storage tube used during the "write" period is terminated by a signal from switching matrix 16 which disables sweep generator 17.

During the "write" period deflection amplifier 18 applies to the deflection coils 21 the same sweep voltages that are impressed upon deflection coils 19. This is done in order that the live radar information be displayed in the color yellow on the display tube while information is being stored in the storage tube. In order to place range rings upon the face of the display tube, a range ring generator 28 is set into operation by the trigger pulse from radar transmitter 14 and thereupon range ring generator 28 applies signals to display tube 22 through video amplifier 24 and isolation diode 25. These range rings are concentric about the electrical center of the PPI sweep.

The "write" period, as noted, is terminated by switching matrix 16 which, after the period allotted for storing video information, causes video amplifier 23 to be gated off, video amplifier 24 to be gated off, conditions storage tube 20 so that the stored information may be read out, gates video amplifier 29 to accept output signals from the storage tube, and causes PPI sweep generator 17 to terminate the sweep. After a suitable guard time, switching matrix 16 causes spiral sweep generator 27 to be activated. Spiral sweep generator 27 is connected through deflection amplifier 18 to the deflection coils of storage tube 20 and display tube 22. The video information in the storage tube is rapidly read out and impressed upon the input of the display tube by video amplifier 29 and isolation diode 30. While the video information is being read out, range ring generator 18 is disabled by a signal from spiral sweep generator 27. The persistence of the phosphor coating of display tube 22 is of sufficient duration to retain the range rings on the face of the tube while the video information is being read out and displayed. The spiral sweep, since it is highly repetitive, covers the entire area of the two-color display tube 22 approximately thirty times per second so that a blue-white picture of the information stored in storage tube 20 is produced.

It should be understood that the storage tube information is applied to the two-color display tube at a rapid frame rate which is above the flicker rate visible by the eye. This frequency of picture frames produces a blue-white picture of the target trails and other stored information. It should be noted that the raw PPI data from video amplifier 24 momentarily produces a blue flash which is normally not noticed due to its rapid decay, say at least one thirtieth of a second. This blue flash energizes the yellow phosphor so that the data appears as yellow. In this manner, an operator can tell at a glance the location of the yellow target as opposed to the blue-white target trail.

While a standard P–7 type display tube such as a model 16ADP7 tube shown in volume T–2 of the RCA Tube Handbook, HB–3, is used in the present embodiment of the invention, it should be understood that any display tube provided with a short and long persistence coating can be used to produce the differentiating colors. In addition, the intensity of the PPI beam, as a further refinement, may be reduced during the fast spiral sweep to provide greater picture definition, and switching matrix 16 may be provided with means for controlling the relative output from video amplifiers 23 and 24 to adjust the video brightness individually at the cathode ray tube 22 during both the PPI and spiral sweeps. With this arrangement, the video input levels can be adjusted to provide blue trails at the location of all stored information except where raw video from the radar receiver has produced a yellow dot of sufficient brightness to mask the stored blue dot, indicating the latest target position.

For the foregoing reasons it is to be understood that the above-described arrangements are illustrative of the application of the principles of the invention. However, many modifications will be apparent to persons skilled in the art without departing from the spirit and scope of this invention. Accordingly, it is desired that this invention not be limited by the particular details described herein except as defined by the appended claims.

What is claimed is:

1. A radar display system comprising a radar transmitter having a rotatable directional antenna, a radar receiver, a storage tube having a storage surface adapted to be scanned by an electron beam, means for impressing the output of said receiver upon the input circuit of said storage tube, means for sweeping the electron beam of said storage tube to cause said receiver output signals to be recorded in said tube as a picture on which moving objects produce tracks, a cathode ray display tube having a display screen adapted to provide a first color of short persistence and a second color of long persistence, said cathode ray display tube coupled to the output circuit of said storage tube, means for applying said receiver output signals to said cathode ray display tube during the time said signals are being recorded in said storage tube, sweep generator means for periodically reading out said recorded signals from said storage tube, and means for impressing said recorded signals on the input circuit of said cathode ray display tube.

2. A radar display system comprising a radar transmitter having a rotatable directional antenna, a radar receiver, a storage tube having a storage surface adapted to be scanned by an electron beam, means for impressing the output signals of said receiver upon the input circuit of said storage tube, means for sweeping the electron beam of said storage tube to cause said receiver output signals to be recorded in said storage tube as a picture on which moving objects produce tracks, a cathode ray display tube adapted to provide a first color of short persistence and a second color of long persistence, said cathode ray display tube coupled to said radar receiver and the output circuit of said storage tube, means for sweeping the cathode ray of said display tube simultaneously with the sweeping of the electron beam of said storage tube, means for periodically disabling the input circuit of said storage tube for a predetermined time period, and means for reading out said recorded signals from said storage tube, means for impressing said read out recorded signals on the input circuit of said display tube during the period of time when the input circuit of said storage tube is disabled.

3. A radar display system comprising a radar transmitter having a rotatable directional antenna, a radar receiver, a storage tube having a storage surface adapted to be scanned by an electron beam, means for impressing the output signals of said receiver upon the input circuit of said storage tube, means for sweeping the electron beam of said storage tube to cause said receiver output signals to be recorded in said tube as a picture on which moving objects produce tracks, a cathode ray display tube having a display screen adapted to provide a first color of short persistence and a second color of long persistence, said cathode ray display tube coupled to said radar receiver and the output circuit of said storage tube, means for sweeping the cahode ray of said display tube simultaneously with the sweeping of the electron beam of said storage tube, means for periodically disabling the input circuit of said storage tube for a predetermined time period, and sweep generator means cooperating with timing means for reading out said recorded signals from said storage tube and impressing said recorded signals on the input circuit of said display tube during the period of time when the input circuit of said storage tube is disabled, said latter recited means including means for causing the electron beam of said display tube to be swept in the same manner as the electron beam of said storage tube.

4. A radar display system comprising a radar transmitter having a rotatable directional antenna, a radar receiver, a storage tube having a storage surface adapted to be scanned by an electron beam, means for impressing the output signals of said receiver upon the input circuit of said storage tube, means for sweeping the electron beam of said storage tube to cause said receiver output signals to be recorded in said tube as a picture on which moving objects produce tracks, a cathode ray display tube adapted to provide a first color of short persistence and a second color of long persistence, said cathode ray display tube coupled to said radar receiver and the output circuit of said storage tube, means for sweeping the cathode ray of said display tube simultaneously with the sweeping of the electron beam of said storage tube, means for periodically disabling the input circuit of said storage tube for a predetermined time period, sweep generator means for reading out said recorded signals from said storage tube, means for impressing said recorded signals on the input circuit of said cathode ray display tube to produce a picture in said first color during the period of time when the input of said storage tube is disabled, and means for feeding said output signals of said receiver directly to the input circuit of said display tube to produce a picture in said second color during the period of time when said input circuit of said storage tube is not disabled.

5. In combination, means for receiving echo range signals, means connected to the output of said receiving means for sequentially storing in superposed relationship time-successive representations of a field of view from which such echo signals are received by said receiving means to provide tracks thereon representative of the paths of moving objects in such area, and means having an input connected to the outputs of both said receiving means and said storing means for concurrently displaying in superposed relationship in respectively different colors a representation of such field of view at a given time as provided by the output of said receiving means at such time and a representation of a summation of the field of view information applied to said storing means prior to such given time.

6. In combination, means for receiving echo range signals, means connected to the output of said receiving means for sequentially storing in superposed relationship time-successive representations of a field of view from which such echo signals are received by said receiving means to provide tracks thereon representative of the paths of moving objects in such area, means including a cathode ray tube having a display screen of long-persistence characteristics in a first color and of short-persistence characteristics in a second color for providing a visual output display selectively in two colors, means for activating said short-persistence characteristics in accordance with said stored picture representations, and means connected to the output of said receiving means for activating said long-persistence characteristics in accordance with concurrently-received echo picture representations.

References Cited in the file of this patent

UNITED STATES PATENTS

| | | |
|---|---|---|
| 2,446,248 | Shrader | Aug. 3, 1948 |
| 2,702,356 | Flory | Feb. 15, 1955 |
| 2,779,017 | Land | Jan. 22, 1957 |
| 2,822,536 | Sandretto | Feb. 4, 1958 |
| 2,905,938 | Matthews | Sept. 22, 1959 |